United States Patent [19]
Nishizaki et al.

[11] Patent Number: 5,550,663
[45] Date of Patent: Aug. 27, 1996

[54] METHOD OF MANUFACTURING OPTICAL LOW-PASS FILTER

[75] Inventors: Osamu Nishizaki, Takatsuki; Shigeru Aoyama, Kyoto, both of Japan

[73] Assignee: Omron Corporation, Kyoto, Japan

[21] Appl. No.: 248,248

[22] Filed: May 24, 1994

[51] Int. Cl.$^6$ .............................. G02F 1/13; G02B 27/46; H04N 9/083
[52] U.S. Cl. .............................. 359/95; 359/569; 348/291
[58] Field of Search .................................. 359/95, 67, 66, 359/498, 569, 900, 570, 574; 348/291

[56] References Cited

U.S. PATENT DOCUMENTS

| | | | |
|---|---|---|---|
| 3,728,014 | 4/1973 | Rosenblum | 359/569 |
| 3,821,795 | 6/1974 | Okano | 348/291 |
| 4,472,735 | 9/1984 | Shinozaki et al. | 348/291 |
| 4,998,800 | 3/1991 | Nishida et al. | 348/291 |
| 5,046,827 | 9/1991 | Frost et al. | 359/54 |
| 5,204,765 | 4/1993 | Mitsui et al. | 359/900 |

FOREIGN PATENT DOCUMENTS

| | | |
|---|---|---|
| 63-114475 | 5/1988 | Japan . |
| 3-198003 | 8/1991 | Japan . |
| 5-307174 | 11/1993 | Japan . |

OTHER PUBLICATIONS

Fujisawa et al., "Optical Low-Pass Filter Using the Organic Optical Material", ITEJ Technical Report, vol. 14, No. 53, Sep. 1990, pp. 7–12.

O. Wada, "Ion-Beam Etching of InP and Its Application to the Fabrication of High Radiance InGaAsP/Inp Light Emitting Diodes", J. electrochem. Soc. Solid-State Science and Technology, vol. 131, No. Oct. 1984 pp. 2373–2380.

*Primary Examiner*—William L. Sikes
*Assistant Examiner*—Charles Miller
*Attorney, Agent, or Firm*—Foley & Lardner

[57] ABSTRACT

A mother layer made of a thermoplastic resin is formed on the substrate. The mother layer is etched to make a grating layer. The etching process is stopped so that an offset layer remains under the grating layer. The grating layer and the offset layer are baked to be molten. The baking process is stopped when a phase grating defined by a surface having a sinusoidal shape is formed.

53 Claims, 16 Drawing Sheets

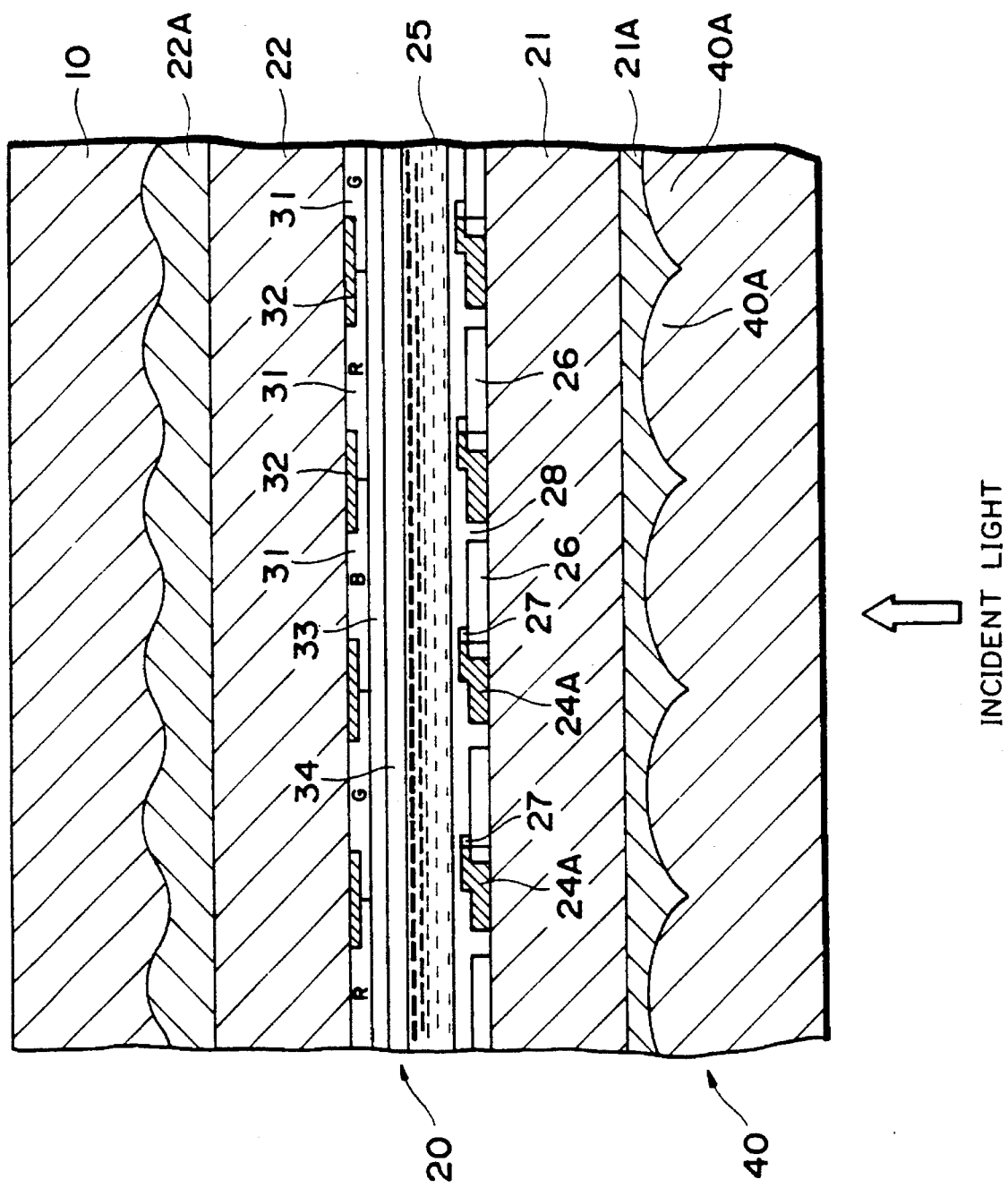

ULTRAVIOLET RAY 5,550,663

METHOD OF MANUFACTURING OPTICAL LOW-PASS FILTER

BACKGROUND OF THE INVENTION

1. Field of the Invention

The present invention relates to a method of manufacturing an optical low-pass filter, an optical low-pass filter and applications of the optical low-pass filter.

2. Description of the Related Art

In an image display device, such as a liquid-crystal panel, which represents an image by a plurality of pixels arranged two-dimensionally, so called sampling noises originating from the structure of the pixels arranged two-dimensionally appear to deteriorate the quality of the image.

It is proposed in order to reduce the noises that the image display device is provided with a phase grating serving as an optical low-pass filter which allows spatial frequency components the frequencies of which are lower than a frequency determined by a pitch of dots in the display device to pass therethrough (e.g., Japanese Patent Application Laid Open Publication No. 63-114455). It is known that the phase grating with a cross-section shape of a sinusoidal wave acts as an excellent optical low-pass filter (see Fujisawa et al. "Optical Low-Pass Filter Using the Organic Optical Material", ITEJ Technical Report Vol. 14, No. 53, pp 7–12, Sep. 1990). Method of designing the phase grating is also proposed (see Japanese Patent Application Laid Open Publication No. 5-307174).

However it is very difficult to actually obtain a phase grating the cross-section of which is a sinusoidal waveform or near thereto. A method of manufacturing a microlens array is known (e.g., Japanese Patent Application Laid Open Publication No. 3-198003). According to this method, an array of cylinders is formed on a substrate by a photolithography technique. The cylinders are molten by heating to form an array of spherical microlenses. Although the array of spherical microlenses is fabricated, a phase grating having a sinusoidal waveform surface cannot be realized.

SUMMARY OF THE INVENTION

An object of the present invention is to provide a method of manufacturing an optical low-pass filter including a phase grating the cross-section of which is a substantially sinusoidal waveform relatively easily.

Another object of the invention is to provide an optical low-pass filter and applications of the optical low-pass filter.

A method of manufacturing an optical low-pass filter according to the present invention comprises the steps of: forming a mother layer made of a thermoplastic resin on a substrate; forming a phase grating base layer comprising a grating layer and an offset layer disposed under the grating layer by etching the mother layer through a mask to make the grating layer and stopping the etching process so that the offset layer remains; baking the phase grating base layer to melt and stopping the baking process when a phase grating defined by a surface having a sinusoidal shape is formed; and cooling the phase grating to solidify.

According to the present invention, the offset layer is provided between the grating layer and the substrate. The offset layer is made of the same material as that of the grating layer. When baked, not only the grating layer but also the offset layer are molten. The friction between the offset layer and the substrate has no influence on the change in the shape of surface of the grating layer. Accordingly, the shape of the surface of the grating layer changes even in a low temperature baking (even in a case where viscosity is high), so that the fluidity and flow velocity of the molten material is easily controlled to realize a sinusoidal waveform in cross section.

Further, the present invention provides an optical low-pass filter manufactured by the above method, and applications of the optical low-pass filter, such as a display device, imaging device and view finder.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is an enlarged cross sectional view of another liquid-crystal panel;

DESCRIPTION OF THE PREFERRED EMBODIMENTS (1) Application of Optical Low-Pass Filter to Liquid-Crystal Panel FIGS. 1 and 2 show an application example of an optical low-pass filter, where the optical low-pass filter is applied to a liquid-crystal panel.

FIG. 1 schematically illustrates a portion of an enlarged cross section of a liquid-crystal panel 20. An insulating film and the internal structure of switching elements are not illustrated. FIG. 2 shows an equivalent circuit of pixel electrodes, switching elements and conductive wiring patterns formed on the surface of one of two glass substrates 21 and 22 constructing the liquid-crystal panel 20.

As shown in FIGS. 1 and 2, the liquid-crystal panel 20 basically comprises two glass substrates 21 and 22 arranged with a small spacing (e.g., on the order of 2 μm) between them, and a liquid-crystal 25 filling the gap between the glass substrates 21 and 22. A number of uniformly spaced, horizontally extending scanning electrodes 24A and a number of uniformly spaced, vertically extending signal electrodes 24B are formed on the inner surface of one glass substrate 21. The scanning electrodes 24A and the signal electrodes 24B are insulated from each other (the signal electrodes 24B are omitted from the drawing of FIG. 1). In the description that follows, the scanning electrodes 24A and the signal electrodes 24B shall be called a conductive wiring pattern 24 when referred to collectively.

Figure 1:
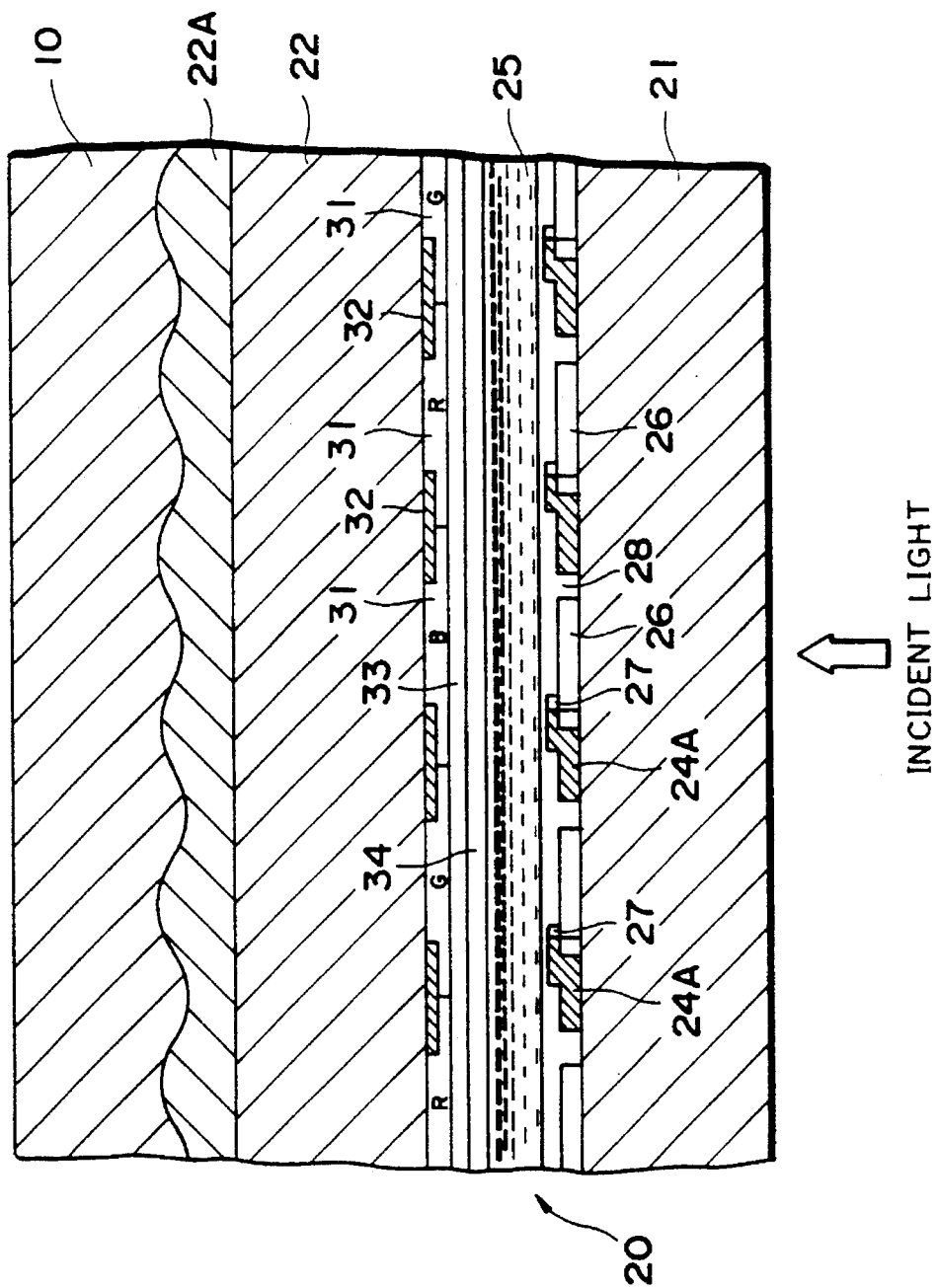
FIG. 1 is an enlarged cross sectional view of a liquid-crystal panel.
Figure 2:
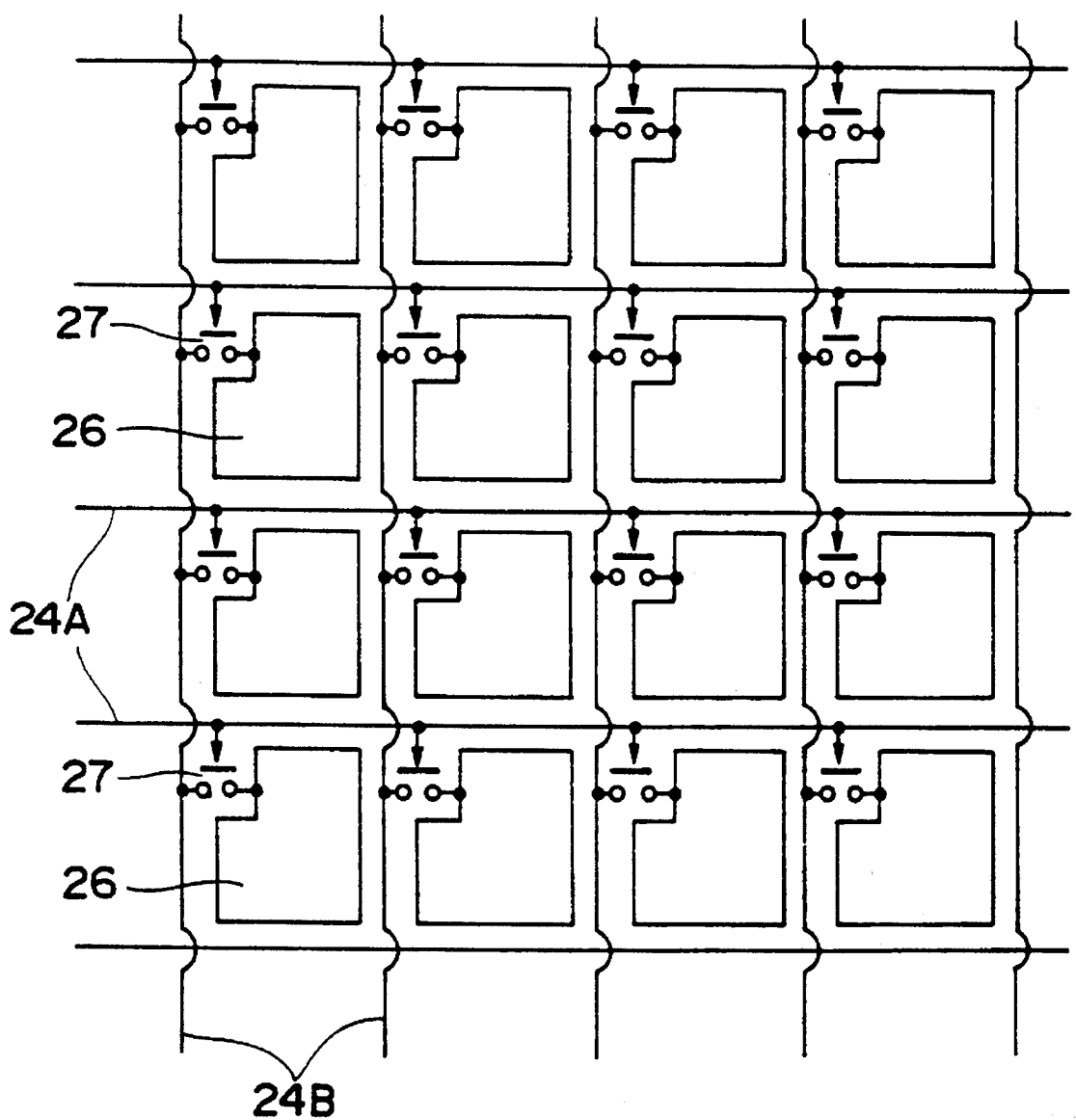
FIG. 2 shows an equivalent circuit of the liquid-crystal panel.

Pixel electrodes 26 are formed in a matrix configuration and in a mutually insulated state in the areas delimited by the scanning electrodes 24A and signal electrodes 24B. Each pixel electrode 26 is connected to the corresponding adjacent signal electrode 24B via a three-terminal switching element 27 (a thin-film transistor comprising a FET, by way of example). Each switching element 27 has a control terminal (e.g., a gate terminal) connected to the corresponding adjacent scanning electrode 24A. Furthermore, an alignment film 28 is formed on the entire inner surface of the glass substrate 21 so as to cover the electrodes 24A, 24B and 26.

Formed on the inner surface of the other glass substrate 22 are R, G and B color filters 31 at positions opposing the pixel electrodes 26, as well as light-shielding films (a black matrix) 32 at positions corresponding to the wiring pattern 24. It is well known that the array of the color filters 31 may be a triangular (or delta) array, a mosaic array, a stripe array, etc.

A common electrode 33 is formed on the entire inner surface of the glass substrate 22 so as to cover the color filters 31, and an alignment film 34 is formed on the common electrode 33.

The pixels electrodes 26 and the common electrode 33 consist of a transparent electrically conductive film (e.g., an ITO film). On the other hand, the scanning electrodes 24A, the signal electrodes 24B and the light-shielding film 32 are opaque films consisting of metal or the like. Accordingly, the only areas through which incident light is capable of being transmitted are the areas of the pixel electrodes 26 delimited by the scanning electrodes 24A and the signal electrodes 24B (these areas coincide with the areas not covered by the light-shielding film, i.e., the black matrix 32). The areas through which light is capable of passing shall be referred to as apertures. One pixel is an area demarcated by the center lines of the scanning electrodes 24A and the center lines of the signal electrodes 24B (this area coincides with the area demarcated by the center lines of the black matrix 32). Each such area shall be referred to as pixel.

The structure of the liquid-crystal panel 20 explained above is well known. The display of an image in the liquid-crystal panel 20 is performed in a manner which is well known.

An optical low-pass filter 10 is attached to the outer surface of the glass substrate 22 via an adhesive layer 22A. Preferably the adhesive layer 22A is made of an UV-setting resin, and the refractive index of the optical low-pass filter 10 is greater than that of the adhesive layer 22A. The optical low-pass filter 10 may be disposed at a position adjacent to the glass substrate 22. In this case the layer 22A may be replaced with an air layer.

The optical low-pass filter 10 is a kind of a phase grating and has a surface defined by periodic depressions and projections. The surface of the optical low-pass filter 10 defined by the depressions and projections exhibits a sinusoidal waveform in its cross section of any direction. That is, the sinusoidal waveform spread two dimensionally along the surface of the filter 10. The optical low-pass filter 10 is also referred to as a sinusoidal grating. The optical low-pass filter 10 allows spatial frequency components of light having frequencies below a cut-off frequency defined by a period of the black matrix 32 or color filters 31 of the liquid-crystal panel 20, which will be explained in detail later, to pass therethrough. A noisy light pattern due to the existence of the black matrix 32 or color filters 31 may vanish or may be reduced by the optical low-pass filtering function of the filter 10.

FIG. 3 shows another example of the liquid-crystal panel, in which the same reference numerals are assigned to components which are the same as those shown in FIG. 1.

A micro-lens array 40 is attached to the glass substrate 21 of the liquid-crystal panel 20 with an adhesive layer 21A intervened therebetween. The refractive index of the micro-lens array 40 is greater than that of the layer 21A. The micro-lens array 40 comprises a number of micro lenses 40A arranged two-dimensionally and formed integral with one another. Each of the micro lenses 40A of the micro-lens array 40 is disposed at a position corresponding to each of the apertures (or pixel) of the liquid-crystal panel 20. The micro-lenses 40A of the micro-lens array 40 are provided for the purpose of collecting light at the corresponding apertures by condensing the incident light.

(2) Fabrication of Optical Low-Pass Filter

Process steps for fabrication of an optical low-pass filter are schematically depicted in FIGS. 4a to 4d, in which only a part of intermediate products and a final product are shown. Photolithography technique is utilized in this fabrication process.

Figure 4A:
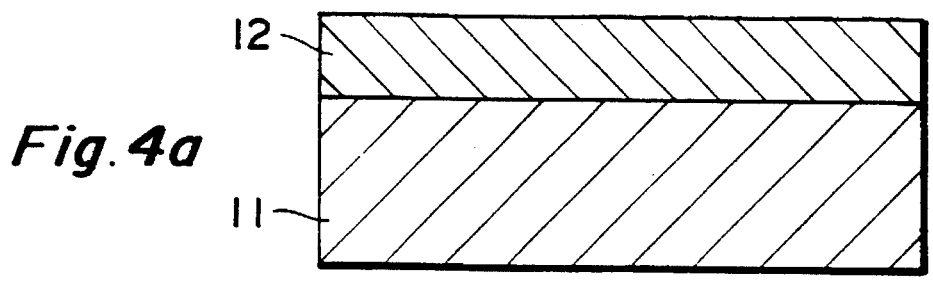
FIGS. 4a to 4d show processes for fabricating an optical low-pass filter.

A film or mother layer of photo-sensitive and thermoplastic synthetic resin 12 with suitable thickness, e.g., about 2.0 μm, for example, a positive acting photoresist of a novolak type, is formed on a substrate 11 (e.g., SiO$_2$ (glass or quartz) or Si (silicon)) by spin coating (see FIG. 4a).

Figure 4B:
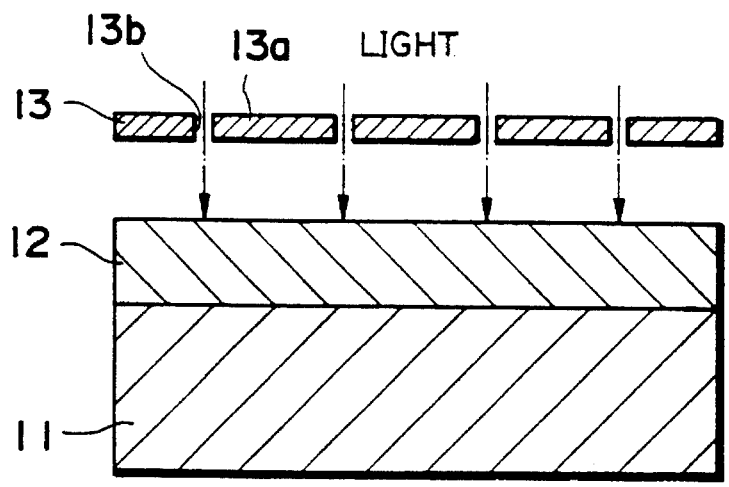

A mask 13 is placed on or above the positive photoresist layer 12 and the photoresist layer 12 is exposed by light (e.g., of near-ultraviolet) through openings or transparent portions 13b of the mask 13 (see FIG. 4b). The mask 13 has portions 13a for shielding light, the portions 13a being of a square and arranged regularly in lateral and longitudinal directions. The transparent portions 13b extend is lateral and logitudinal directions with a predetermined pitch. The portions 13a may be rectangles.

Figure 4C:
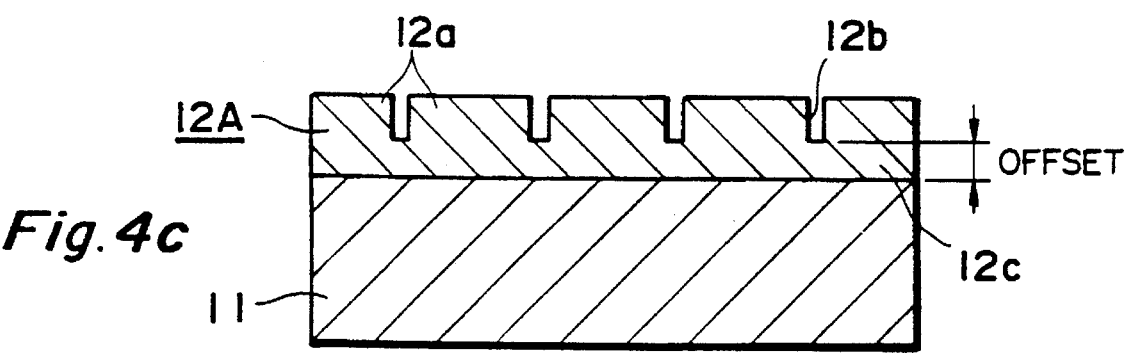
Figure 7:
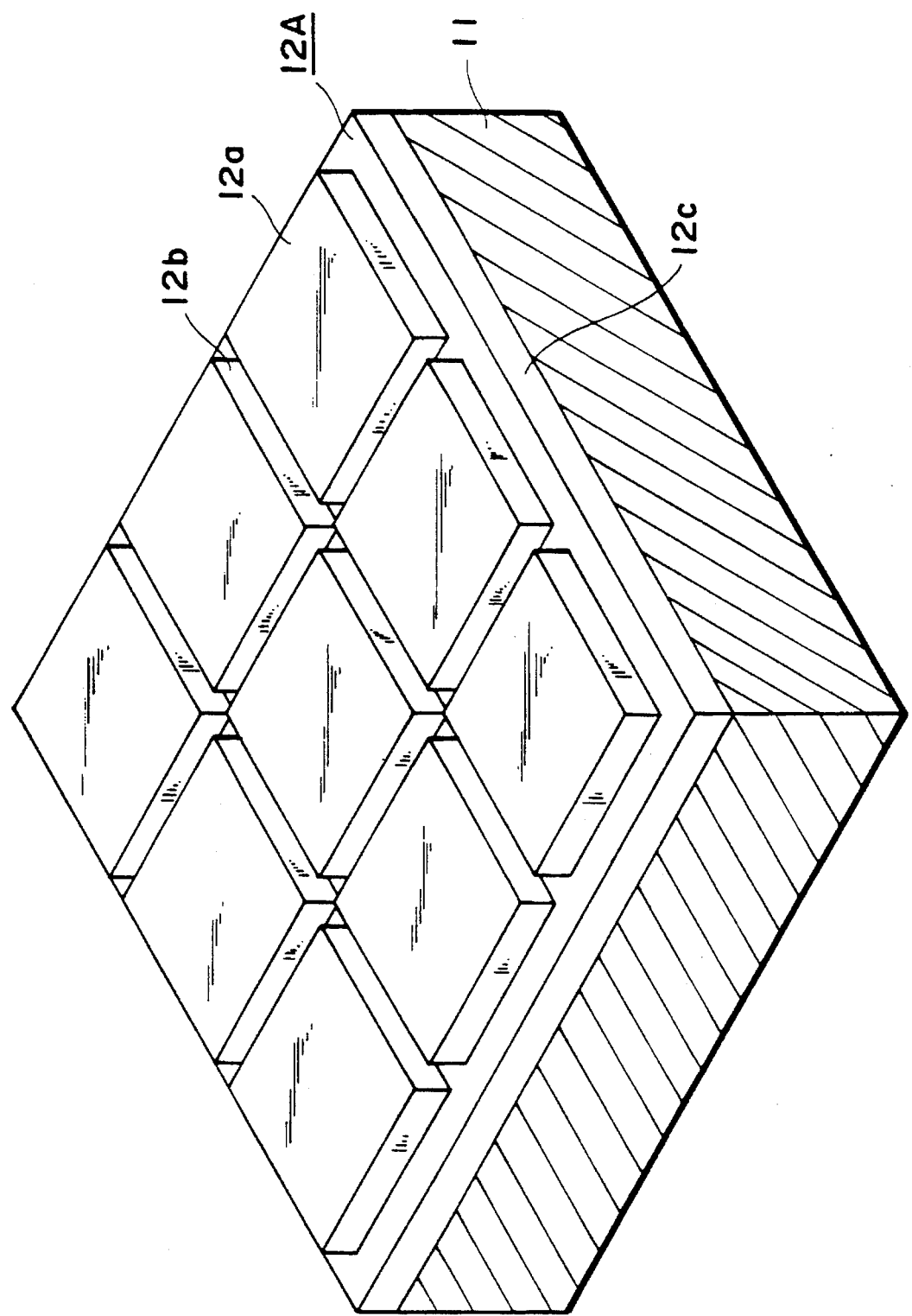
FIG. 7 is an enlarged perspective view of a phase-grating base layer formed on a substrate.

By developing the photoresist, a phase-grating base layer 12A made of the photoresist remains on the substrate 11 (see FIG. 4c and FIG. 7). The base layer 12A comprises an offset layer 12c and a grating layer comprising square (or rectangle in section) pillar portions 12a separated by grooves 12b and disposed on the offset layer 12c. The developing process is so controlled that the offset layer 12c which does not include the grooves 12b remains. The grooves 12b correspond to the transparent portions 13b of the mask 13. The thickness of the offset layer 12c is about half of the thickness of the base layer, i.e., about 1.0 μm.

Figure 8:
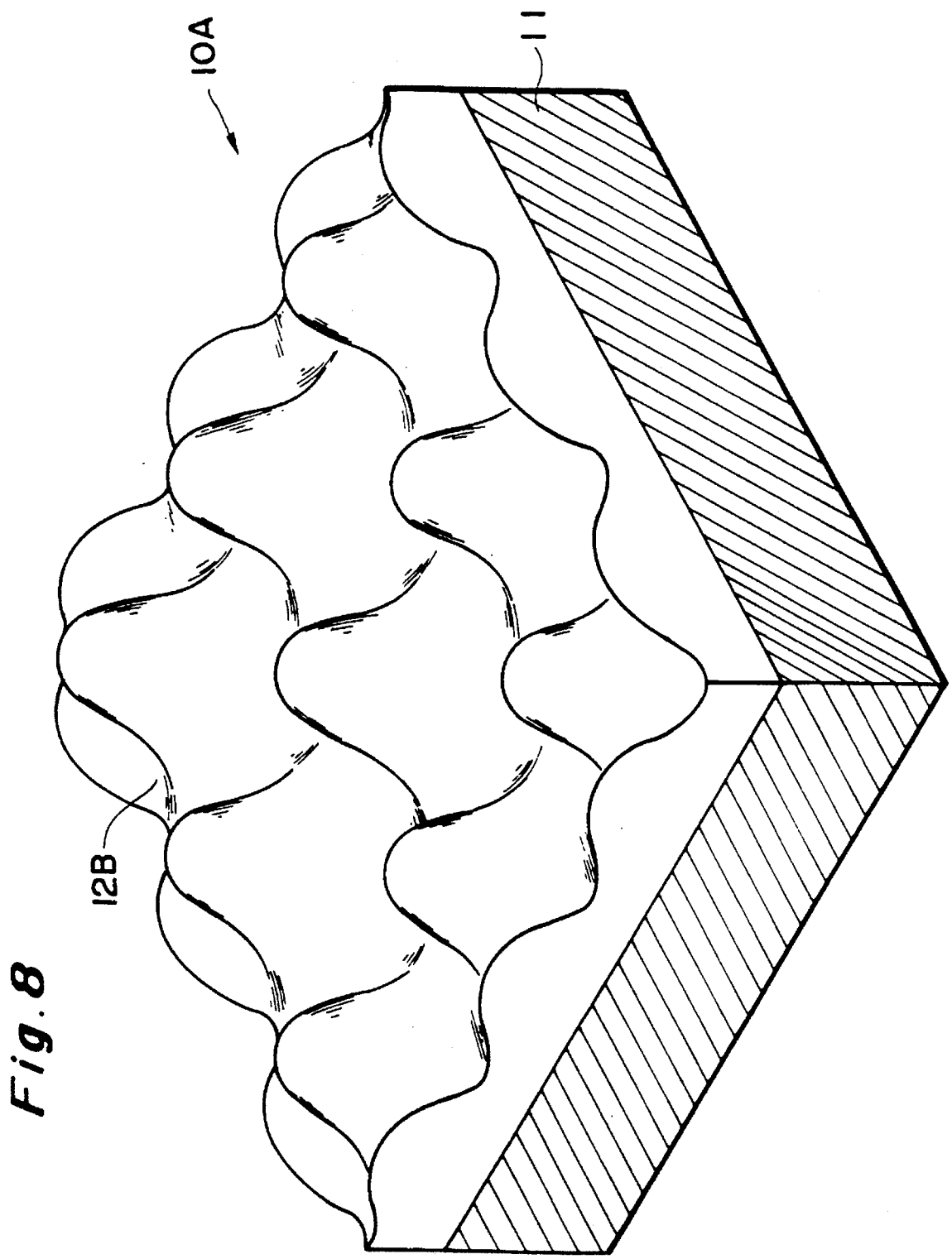
FIG. 8 is an enlarged perspective view of a phase grating formed on a substrate.

The substrate 11 and the phase-grating base layer 12A are heated or baked to above the melting temperature of the photoresist material, but preferably near to the melting temperature, e.g., to 140° C. in the case of above the positive acting photoresist. The photoresist material of the pillar portions 12a melt to be rounded due to the viscosity and surface tension of the molten material. The baking process is controlled so as to cease at the time when the molten material with which the pillar portion has been formed is made to contact with the molten materials of the neighbor pillars portions and the height (or thickness) of depressions originated from the grooves 12b becomes a half of the height (or thickness) of the projections originated from the pillar portions 12a (baked for about 3 minutes). As a result of that a phase grating layer 12B is formed one the substrate 11. The phase grating layer 12B has an upper surface exhibiting a sinusoidal waveform in its cross section of any direction (see FIG. 4d and FIG. 8).

The sinusoidal waveform resulting from the above process is virtually a perfect sinusoid, having a tolerance of less than about 7%, preferably less than about 6%, more preferably less than about 5%, still more preferably less than about 4%, and ideally less than about 3%, where the tolerance is defined as:

$$\frac{\text{Maximum deviation from perfect sine wave}}{\text{Amplitude of perfect sine wave}} \times 100(\%)$$

Figure 4D:
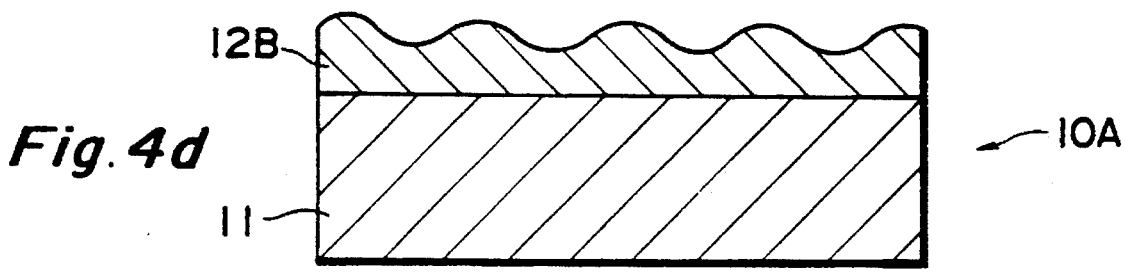

After the baking process the substrate 11 with the phase grating layer 12B is placed in a room temperature atmosphere to be cooled and solidified, and to be an optical low-pass filter 10A as shown in FIG. 4d.

The reason for the offset (or buffer) layer 12c existing on the substrate 11 and below a grating layer (consisting of the pillar portions 12a and grooves 12b) is as follows:

The shape of the molten photoresist material depends on the viscosity and surface tension. In particular the viscosity of the molten photoresist strongly depends on the temperature thereof. By increasing the temperature, the photoresist viscosity decreases and the surface tension dominantes in determining the surface geometry of the molten photoresist (c.f. Osamu Wada "Ion-Beam Etching of InP and Its Application to the Fabrication of High Radiance InGaAsP/InP Light Emitting Diodes" J. Electrochem. Soc. SOLID-STATE SCIENCE AND TECHNOLOGY, Vol. 131, No. 10, pp 2373–2380, Oct. 1984).

Assume a case where only the grating layer (without the offset layer) is formed on the substrate by photolithography technique.

When the grating layer made of the photoresist is baked at a temperature above but near the melting temperature of the photoresist (low temperature baking), e.g., at about 140° C., the molten photoresist becomes round but does not flow out to spread on the substrate due to the high viscosity thereof and the existence of friction (frictional force or resistance) between the molten photoresist and the substrate. Accordingly each of the pillar portions is just formed into a lens having a spherical surface which is isolated from each other.

It is necessary to increase the baking temperature (e.g., more than 50° C. above the melting temperature, that is to say, about 190° C. or above) to form a phase grating having the sinusoidal waveform in cross section (high temperature baking). In the high temperature baking the molten photoresist originated from the pillar portions flows out and spreads over the substrate. The transition in the shape of the molten photoresist from a plurality of pillars isolated from each other to a layer having a flat surface through a phase grating layer (intermediate state) having a sinusoidal surface is very rapid (e.g., several seconds) due to the high viscosity of the molten photoresist. It is very difficult to stop the baking process at a timing when the phase grating layer having the sinusoidal surface is formed. The inventors realized in their experiments that the shape of the molten photoresist is almost uncontrollable in high temperature baking process.

It is necessary to use low temperature baking process in order to control the shape of the molten photoresist. The offset layer is introduced under the grating layer. The molten photoresist originated from the pillar portions easily flows but slowly to form the sinusoidal waveform surface two-dimensionally even in the low temperature baking process due to a lack of friction between the molten photoresist and the substrate.

The offset layer may be replaced with a substrate or synthetic resin layer which has low friction in its surface.

In order to form the grating layer including pillar portions 12a, dry etching may be used in which a mask like the photomask 13 is formed on the thermoplastic resin layer deposited on the substrate 11 and the thermoplastic resin layer is etched by plasma in portions where the mask is not formed so that an offset layer remains.

Photolithography technique is utilized in the above embodiment. Other techniques such as electron-beam (EB) lithography may be used to fabricate the phase grating base layer, as well.

The optical low-pass filter 10A as described above can be used as is. In this case, transparent materials are used as the materials of the substrate and photoresist.

Mass production of optical low-pass filters is possible using a molding method that employs a mold (an injection molding method or molding method using a resin that is hardened by UV radiation).

Processes for manufacturing a stamper and for manufacturing an optical low-pass filter with use of the stamper are explained briefly hereinafter with reference to FIGS. 5a to 5e.

Figure 5A:
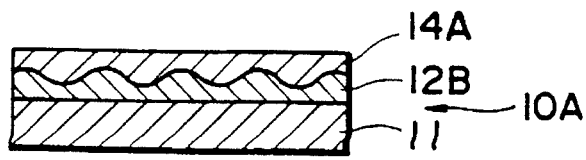
FIGS. 5a to 5e show processes for manufacturing an optical low-pass filter.
Figure 5B:

A nickel film 14A is fabricated on the above described optical low-pass filter 10A comprising the substrate 11 and phase grating layer 12B and serving as a master plate by use of an electroforming method (see FIG. 5a). The master plate is then removed to obtain a nickel stamper 14 comprising the nickel film (see FIG. 5b). The nickel stamper 14 has depressions and projections exhibiting two dimensional sinusoidal waveforms and corresponding to projections and depressions defining the surface of the optical low-pass filter 10A.

Figure 5C:
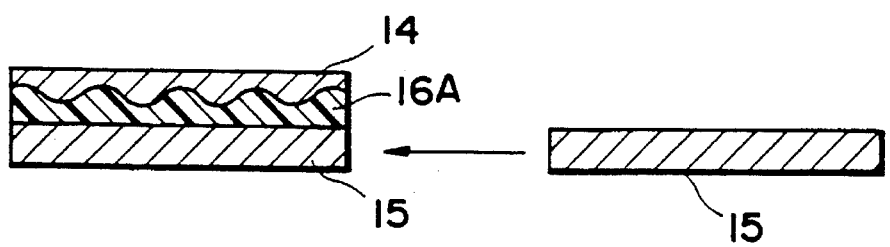
Figure 5D:
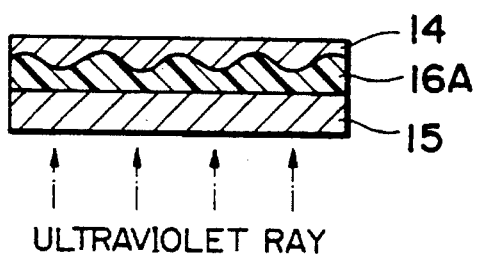

Subsequently, a molten UV-setting resin 16A is filled between the nickel stamper 14 and a transparent substrate 15 and then the nickel stamper 14 and substrate 15 are depressed against each other (see FIG. 5c). An ultraviolet ray is irradiated through the transparent substrate 15 to solidify the UV-setting resin 16A (see FIG. 5d).

Figure 5E:
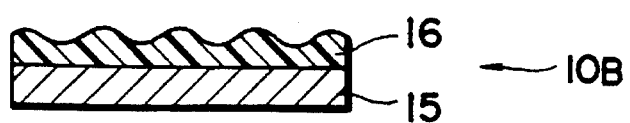

After the resin 16A becomes stiff, the stamper is removed, thereby obtaining an optical low-pass filter 10B which comprises a phase grating layer 16 made of the UV-setting resin formed on the transparent substrate 15 and which has the same configuration as that of the optical low-pass filter 10A shown in FIG. 4d (see FIG. 5e).

Figure 6:
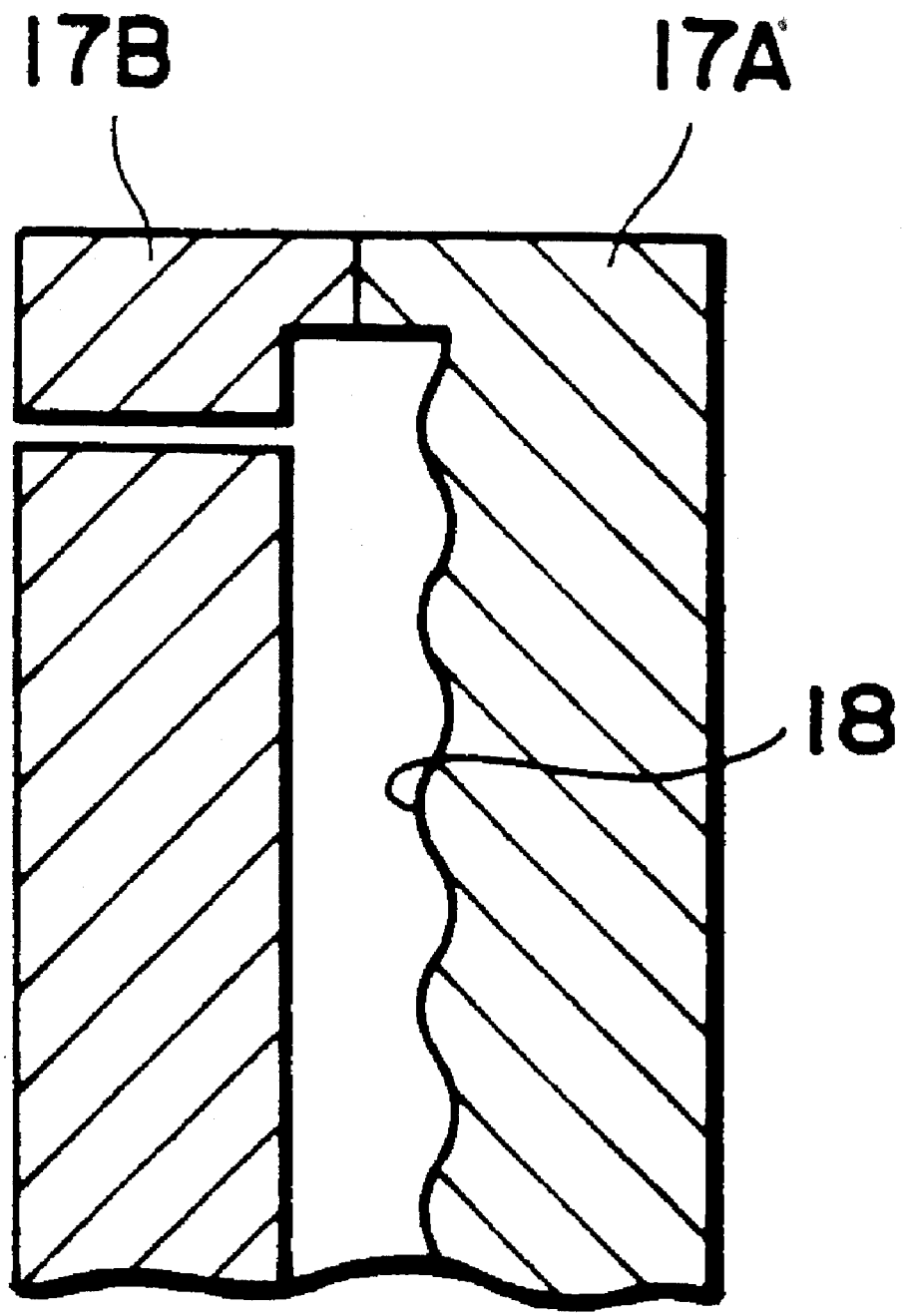
FIG. 6 is a cross section of a mold for use in an injection molding process.

FIG. 6 shows a mold for use in the injection molding process. The mold comprises two split molds 17A and 17B having a cavity 18 formed therein, the configuration of which corresponds to the optical low-pass filter 10A shown in FIG. 4d. The injection molding process as such is well known so that the explanation thereof is omitted.

Figure 9:
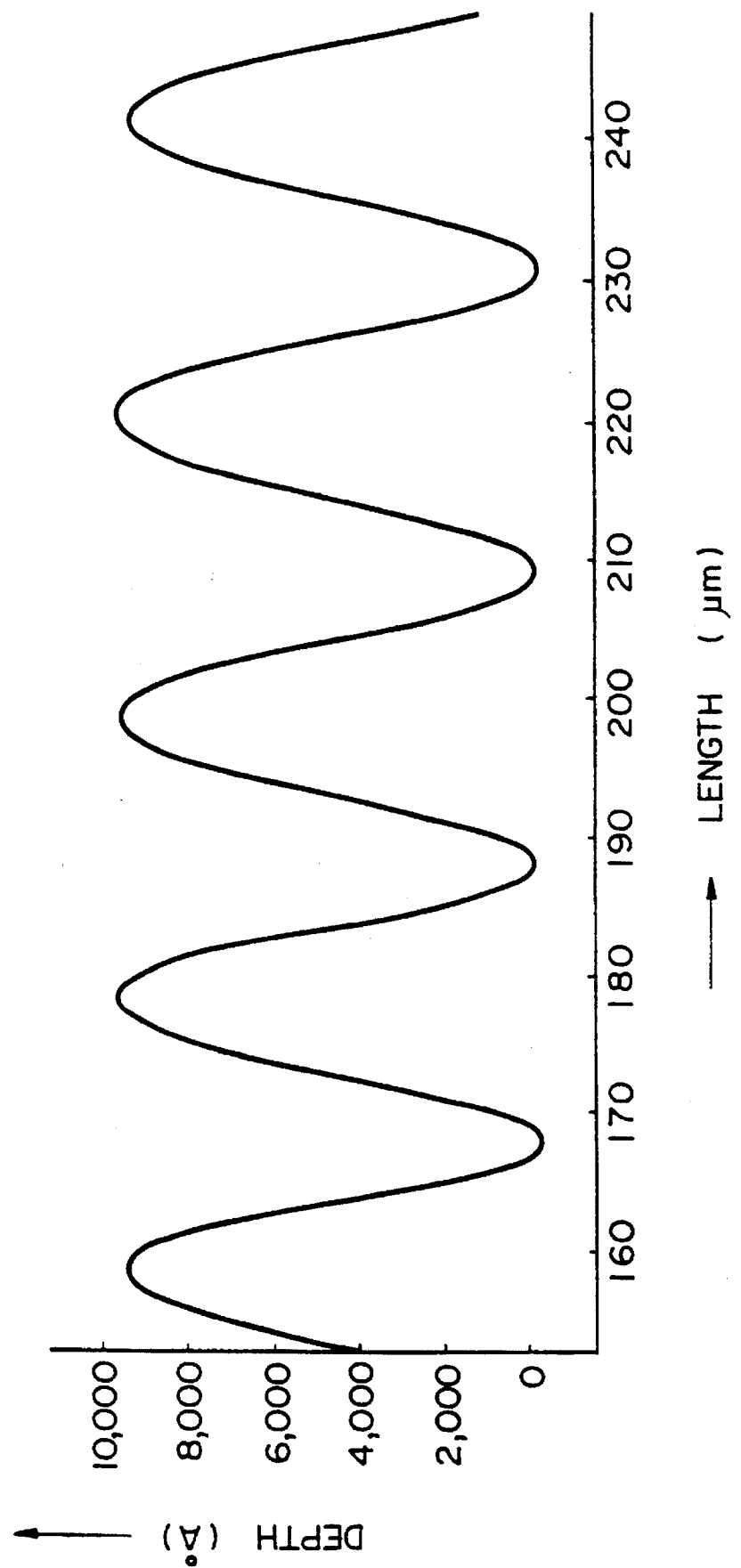
FIG. 9 is a graph showing variation of the surface of the phase grating.

FIG. 9 is a graph showing a configuration of the surface of the optical low-pass filter 10A shown in FIG. 4d. The surface is measured by scanning along a line with use of a scanning type surface shape measuring apparatus "Dektak 3030" of VEECO INSTRUMENT INC. It is apparent from this graph that the height of the surface of the optical low-pass filter shows a sinusoidal form which is an ideal from and that the phase grating is fabricated accurately so that desired optical characteristics can be attained.

Figure 10:
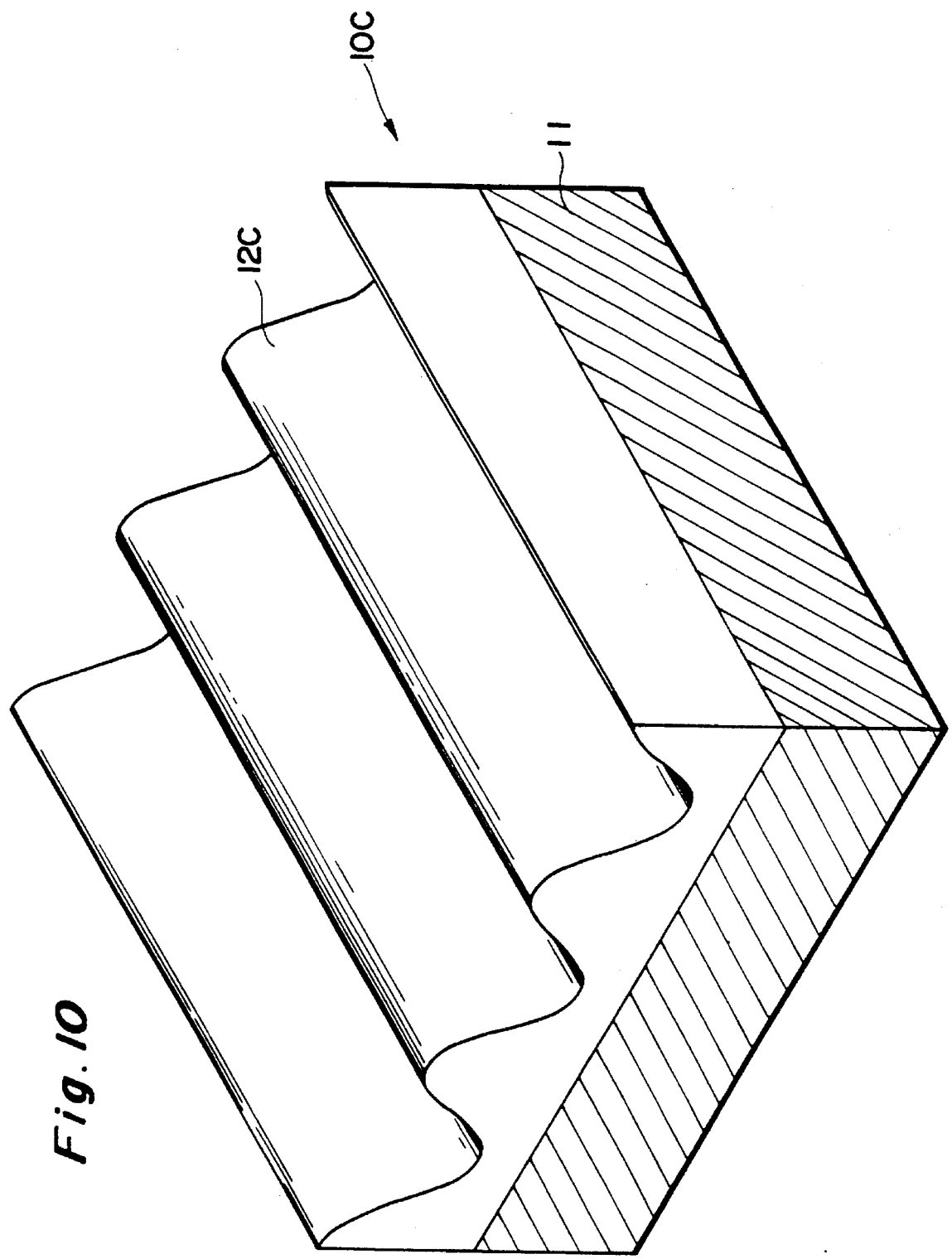
FIG. 10 is an enlarged perspective view of an optical low-pass filter according to another embodiment.

FIG. 10 shows another embodiment of the optical low-pass filter, The optical low-pass filter 10C comprises a phase grating 12C formed on the substrate 11. The phase grating 12C exhibits a sinusoidal waveform in one direction. This one dimensional optical low-pass filter may be manufactured in the same ways as described above.

(3) Design of Optical Low-Pass Filter

Figure 11:
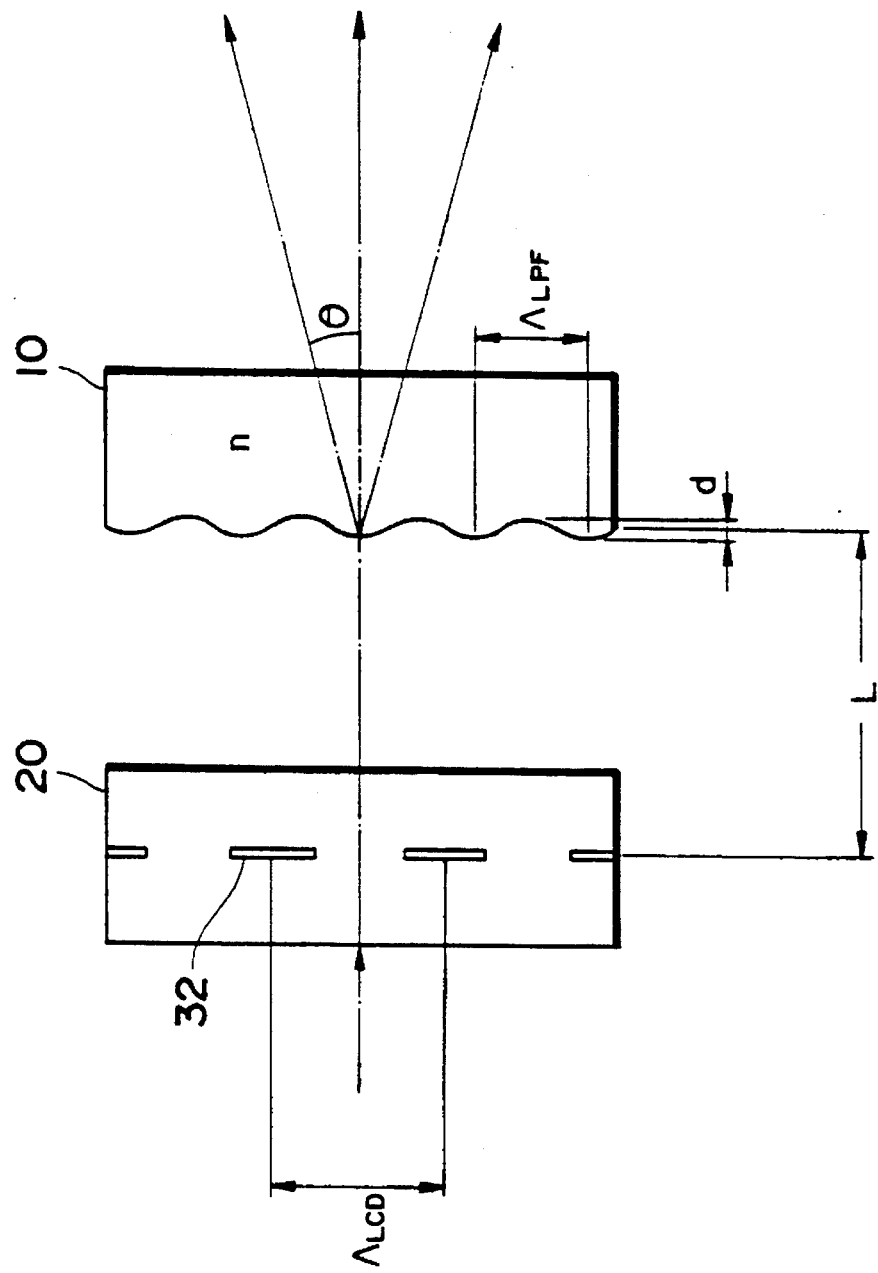
FIG. 11 shows an optical system of a liquid-crystal panel with an optical low-pass filter.

The filtering characteristics of the optical low-pass filter are determined in accordance with its application. The design of the optical low-pass filter is illustrated with regard to its example applied to a liquid-crystal panel and with reference to FIG. 11.

As described above the liquid-crystal panel 20 includes the black matrix (the light-shielding films) 32 delimitating the apertures (or pixels). The periodic arrangement of the black matrix 32 causes noise to human eyes when the liquid-crystal panel 20 displays pictures or characters. Accordingly, in a case where monochrome pictures or characters are displayed on a screen of the liquid-crystal panel, high (spatial) frequency components higher than a black-matrix frequency $f_{BM}$ should be cut off by the optical low-pass filter 10. The black-matrix frequency $f_{BM}$ is defined by the following equation (1).

$$f_{BM} = \Lambda_{LCD}^{-1} \qquad \text{Eq. (1)}$$

where $\Lambda_{LCD}$ is a pitch (period, interval) of the black matrix 32.

Parameters in the optical low-pass filter 10 which should be determined are a thickness d of the phase grating layer and a period $\Lambda$ LPH of the sinusoidal waveform on the surface of the optical low-pass filter 10.

The Modulation Transfer Function (MTF) of the optical low-pass filter is defined as follows:

$$MTF = Co + 2 \sum_{i=0}^{\infty} [C_i \cdot \cos(i \cdot a \cdot 2\pi f_{BM})] \qquad \text{Eq. (2)}$$

$$a = L \cdot \tan \theta \qquad \text{sq. (3)}$$

$$\theta = \sin^{-1}(\lambda/\theta_{LPF}) \qquad \text{Eq. (4)}$$

$$C_i = J_i |\phi|^2 \qquad \text{Eq. (5)}$$

$$\phi = [d(n-1)/\lambda] \cdot 2\pi \qquad \text{Eq. (6)}$$

where
Co: diffraction efficiency of diffracted light of 0-th order
$C_i$: diffraction efficiency of diffracted light of 1st order
a: amount of phase shift
L: optical length
$\theta$: diffraction angle
$\lambda$: wavelength of incident light
n: refractive index of optical low-pass filter
$J_i(x)$: Bessel function of i-th order
$\phi$: phase shift coefficient The thickness d and the period $\theta_{LPF}$ are determined from above equations (2) to (6), when MTF=0 holds with given black matrix frequency $f_{BM}$.

There are two ways to determine the thickness d and the period $\theta_{LPF}$. One is to provisionally decide the thickness d and to calculate the period $\theta_{LPF}$ from the above equations. Another way is to provisionally decide the period $\theta_{LPF}$ and to calculate the thickness d from above equations. In any way, a suitable pair of the thickness d and period $\theta_{LPF}$ is finally determined by repeating the above calculations, varying the thickness d or period $\theta_{LPF}$.

Figure 12:
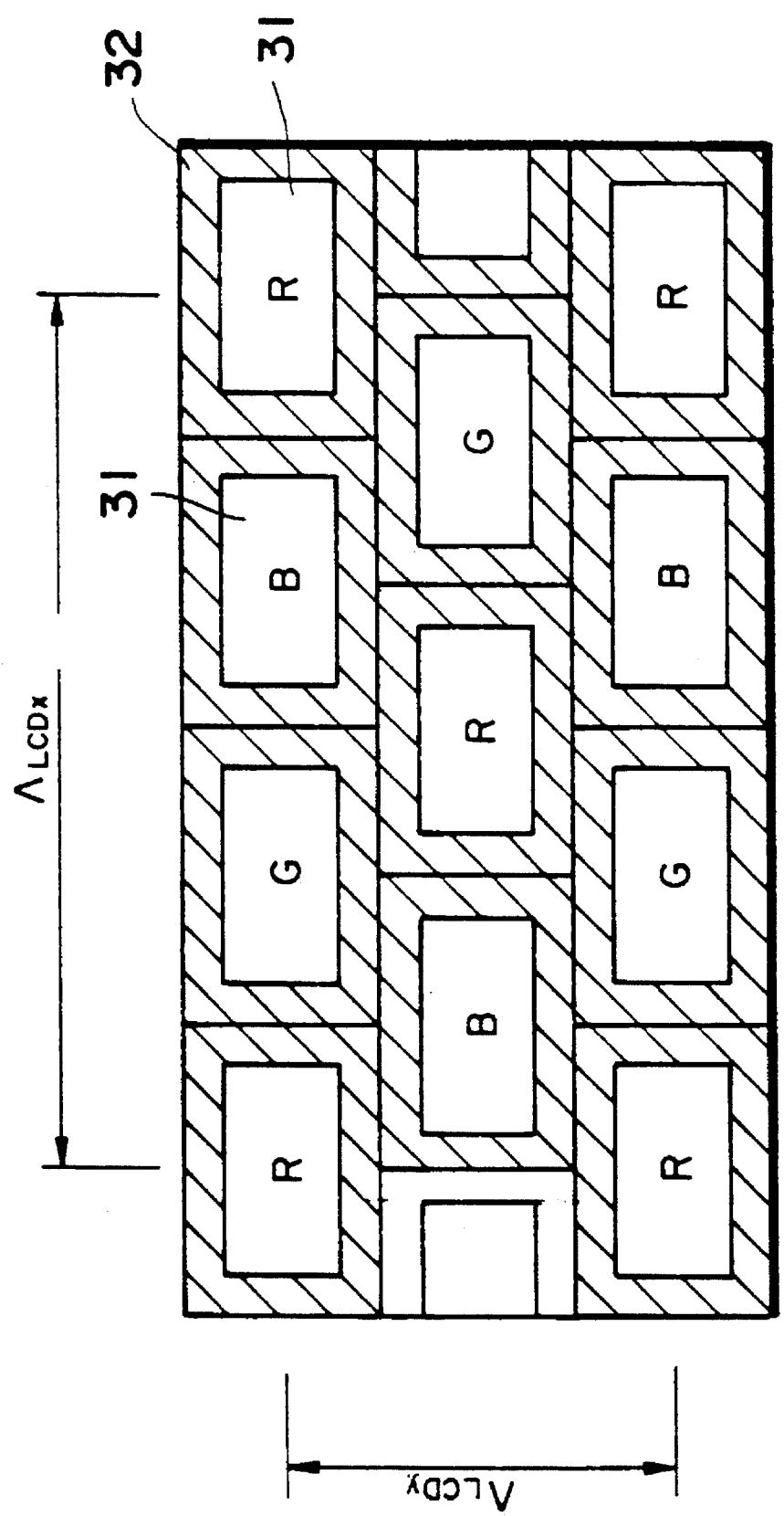
FIG. 12 shows a delta array of color filters in a liquid-crystal panel.
Figure 13:
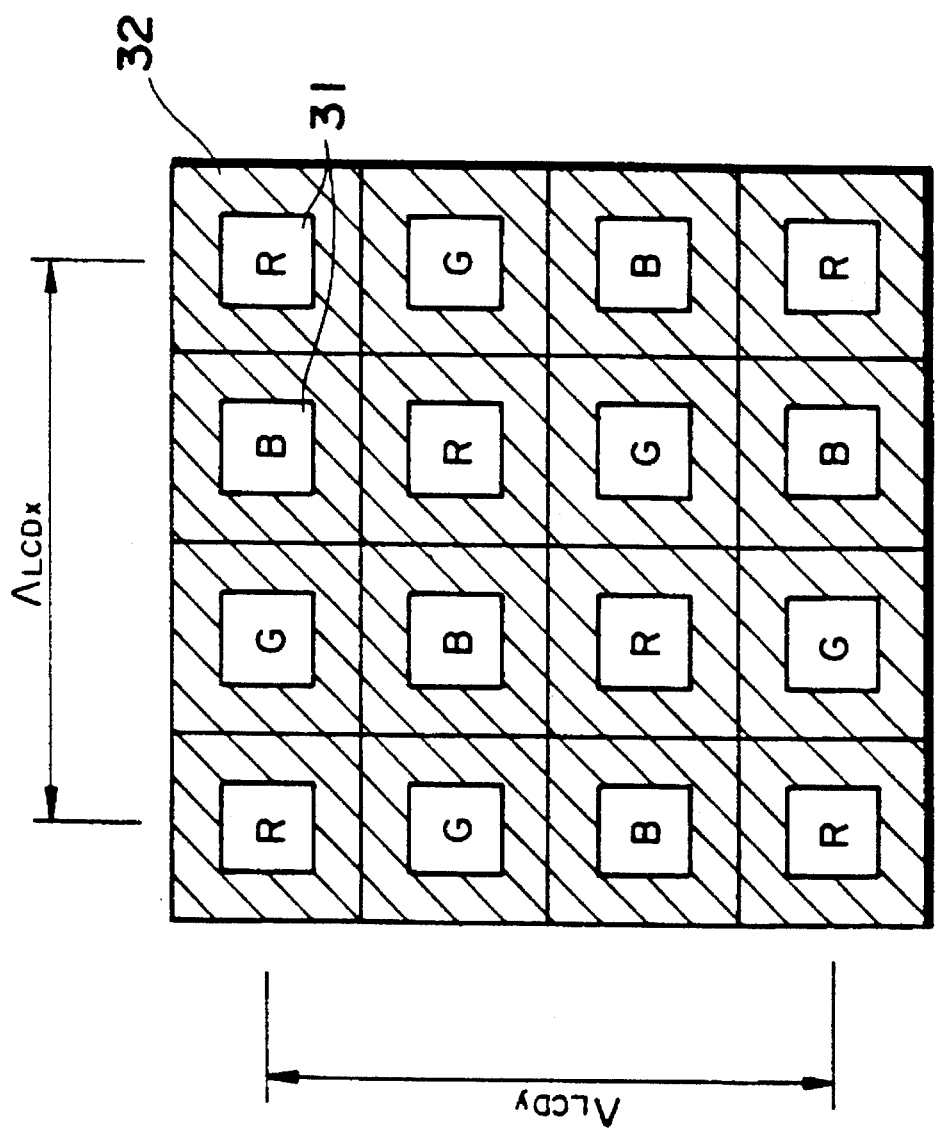
FIG. 13 shows a mosaic array of color filters in a liquid-crystal panel.

FIG. 12 shows a delta array of color filters and FIG. 13 shows a mosaic array of color filters respectively in color liquid-crystal panels.

In these color liquid-crystal panels, noises mainly depend on a sequence of color filters 31 rather than black matrix 32. In FIG. 12, i.e., in the delta array, the pitch of one sequence of color filters 31 in the horizontal direction is indicated by $\theta_{LCDx}$ which is three times the pitch $\theta_{LCD}$ of the black matrix 32. The pitch of one sequence of color filters 31 in the vertical direction is indicated by $\theta_{LCDy}$ which is two times the pitch $\theta_{LCD}$ of the black matrix 32. In FIG. 13, i.e., in the mosaic array, the pitches of one sequence of color filters 31 in the horizontal direction and vertical direction are respectively indicated by $\theta_{LCDx}$ and $\theta_{LCDy}$ which are respectively three times the pitch $\theta_{LCD}$ of the black matrix 32.

In these cases cut-off frequencies $f_{CX}$, $f_{CY}$ of the optical low-pass filter in the horizontal (X) direction and vertical (Y) direction are expressed as follows:

$$f_{CX} = \theta_{LCDx}^{-1} \qquad \text{Eq. (7)}$$

$$f_{CY} = \theta_{LCDy}^{-1} \qquad \text{Eq. (8)}$$

The cut-off frequencies $f_{CX}$ and $f_{CY}$ are respectively used in Eq. (2) in place of $f_{BM}$ to determine the thickness d, and the period $\theta_{LPFx}$ of the sinusoidal waveform in the horizontal direction and $\theta_{LPFy}$ in the vertical direction.

(4) Other Applications of Optical Low-Pass Filter

Figure 14:
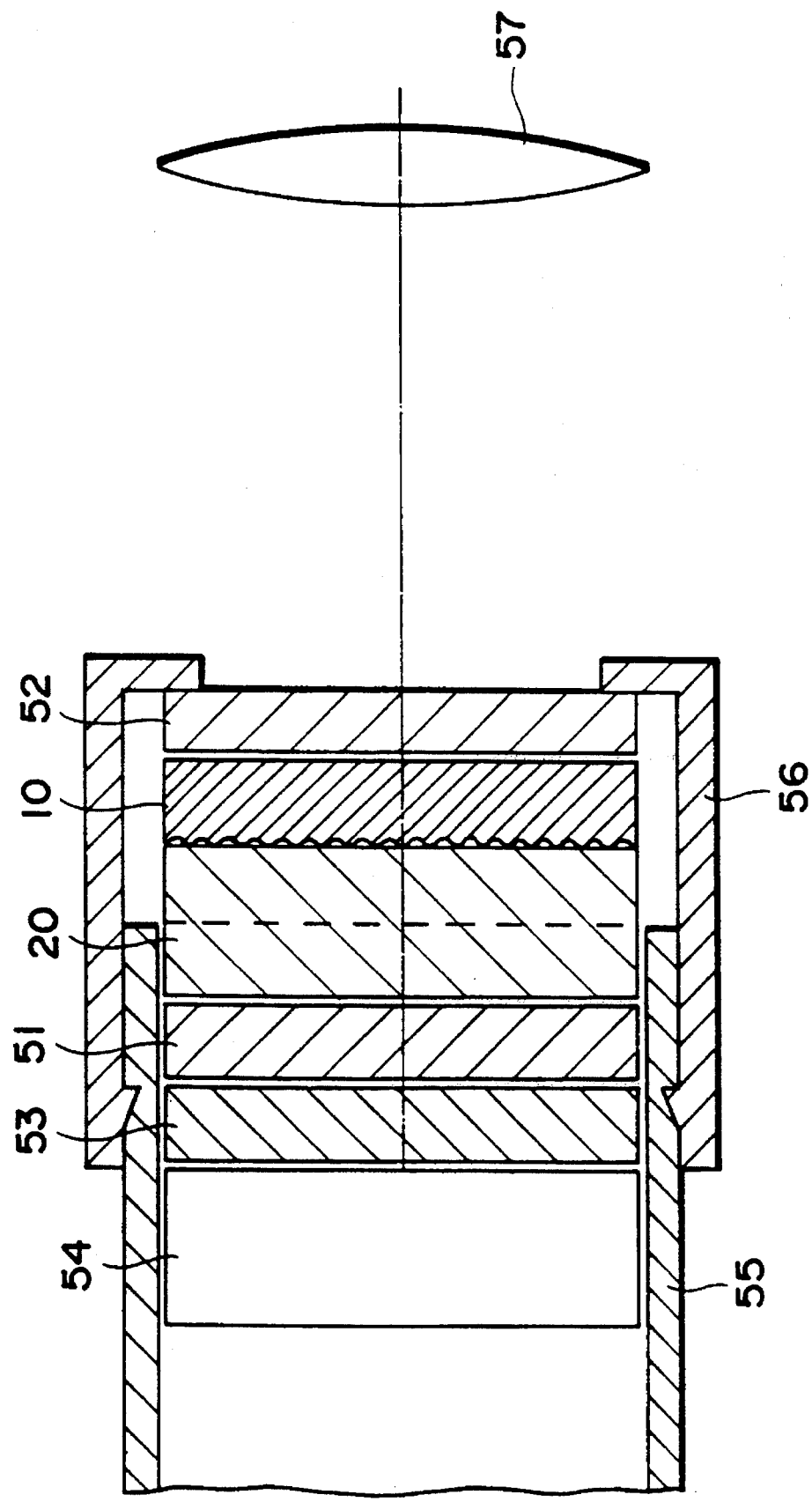
FIG. 14 shows an optical system of a view finder.

FIG. 14 shows an optical system of a view finder which is provided for a video camera inclusive of an electronic still video camera. A light source 54, a light diffusing plate 53, a polarizer 51, a liquid-crystal panel 20, an optical low-pass filter 10 and a polarizer 52 are inserted and fitted in a cylinder 55 in this order, and are covered by a cap 56 which is fitted to the top end of the cylinder 55. The light source 54 includes preferably a cold cathode ray tube. The optical low-pass filter 10 is disposed in front of the liquid-crystal panel 20. Two polarizers whose directions of polarization perpendicularly intersect each other one provided, one in back of the liquid-crystal panel 20 and one in front of the optical low-pass filter 10. Video signals representing an image of a subject picked-up by an imaging device of the video camera and outputted from the imaging device are applied to the liquid-crystal panel 20 and the same image as that picked-up appears on the liquid-crystal panel 20. A lens 57 is provided in front of the liquid-crystal panel 20, optical low-pass filter 10 and polarizer 52, if necessary or preferably.

Figure 15:
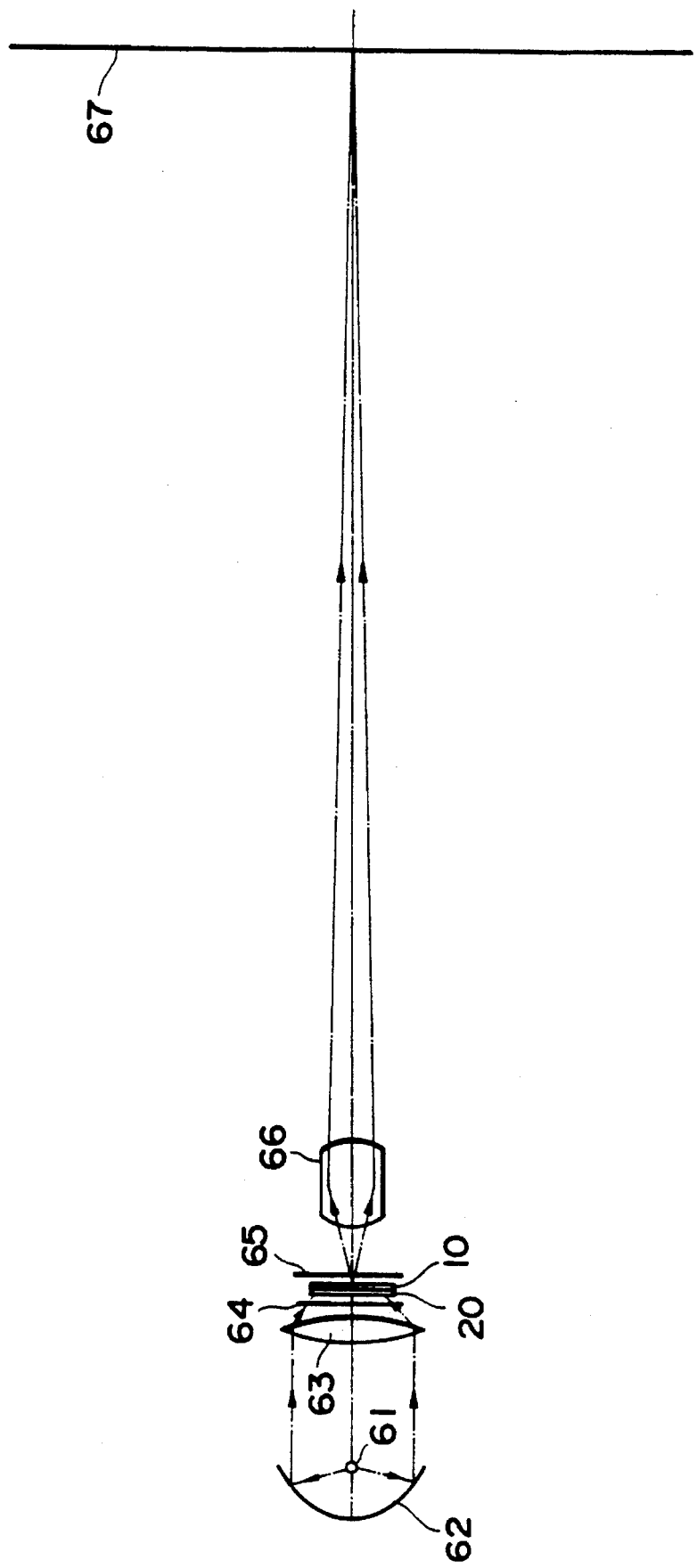
FIG. 15 shows an optical system of a TV projector.

FIG. 15 illustrates the overall optical arrangement of a liquid-crystal TV (television) projector.

Light emitted by a light source 61 is reflected by a parabolic mirror 62 placed in back of the light source 61, whereby the light is rendered substantially parallel. The relected light is condensed by a condenser lens 63. The liquid-crystal panel 20 is disposed in the optical path of the light condensed by the condenser lens 63. The optical low-pass filter 10 is disposed in front of the liquid-crystal panel 20. Two polarizers 64 and 65 whose directions of polarization perpendicularly intersect each other are provided, one in back of the liquid-crystal panel 20 and one in front of the optical low-pass filter 10.

The liquid-crystal panel 20 has a multiplicity of pixels the optical transmittance of which is controlled by an externally applied video signal and by the cooperation of the polarizers 64 and 65. As a result, an image represented by the video signal appears on the surface of the liquid-crystal panel 20. The image represented by the light that has passed through the liquid-crystal panel 20, the optical low-pass filter 10 and the polarizers 64, 65 is formed on a distant screen 67 through an image-forming lens (projecting lens) 66.

Figure 16:
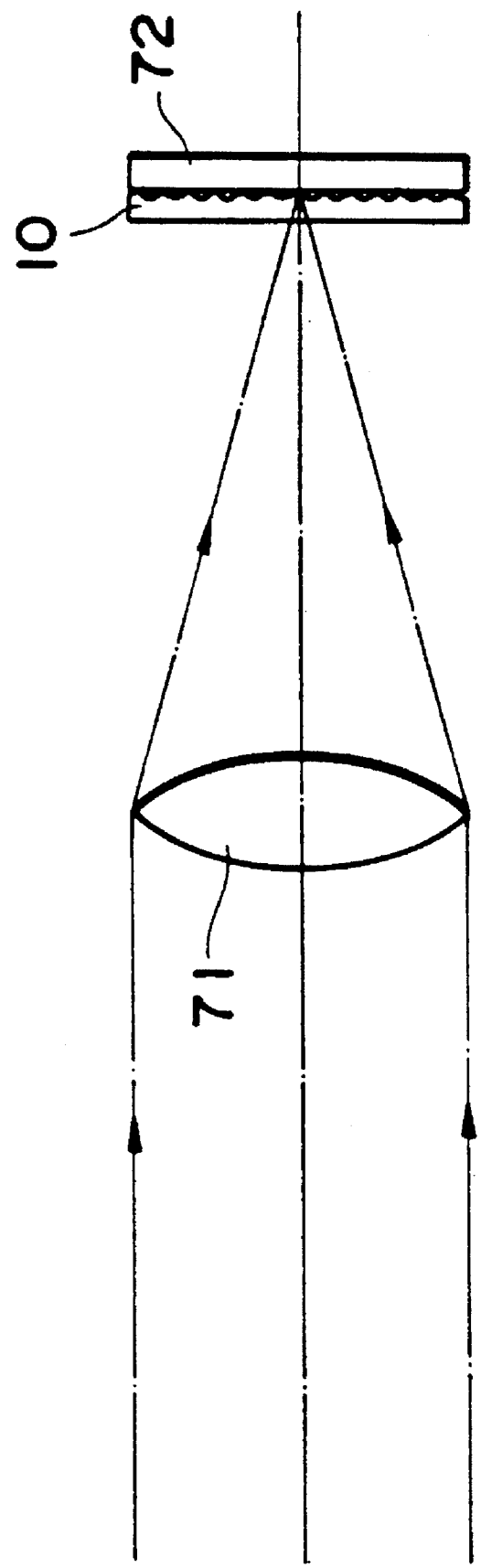
FIG. 16 shows an optical system of an imaging device with a low-pass filter.

FIG. 16 illustrates an image picking-up optical system mounted on a video camera. The incident light representing an image of a subject is focused by an imaging lens 71 on the imaging surface of an imaging device (such as Charge-Coupled Device: CCD) 72 through the optical low-pass filter 10. The optical low-pass filter 10 is placed in front of the imaging device 72.

In general, the sampling frequency of an A/D converter is so determined as to be twice the maximum frequency of an analog signal when the analog signal is converted into digital data. The maximum spatial frequency of the incident light impinging on the imaging device 72 of the video camera cannot be predicted. Accordingly, it is proposed that the optical low-pass filter is so designed as to cut off components having frequencies higher than a frequency which is half of the sampling frequency in the imaging device, so that high frequency components of the image which may not be reproduced are excluded from entering into the imaging device.

The imaging device comprises many photodiodes arranged regularly. The sampling frequency in the imaging device is reciprocal of the period or pitch $\theta_{CCD}$ of the photodiodes arranged on the imaging device. Accordingly, the cut-off frequency $f_{CUT}$ of the optical low-pass filter 10 disposed in front of the imaging device 72 is expressed as follows:

$$f_{CUT}=1/(2\theta_{CCD}) \qquad \text{Eq. (9)}$$

The thickness d of the phase grating of the optical low-pass filter and the period $\theta_{LPF}$ of the sinusoidal waveform defining the surface of the phase grating are so determined that the MTF will be zero in the range of the frequency which extends above the cut-off frequency $f_{CUT}$.

The present invention can be made without departing from the spirit and scope thereof, it is to be understood that the invention is not limited to the specific embodiments thereof except as defined in the appended claims.

What is claimed is:

1. A method of manufacturing an optical low-pass filter comprising the steps of:

forming a mother layer made of a thermoplastic resin on a substrate;

etching the mother layer through a mask to form a grating layer in the upper portion of the mother layer so that an offset layer remains under the grating layer;

baking to melt the grating layer and the offset layer so as to produce a phase grating, the surface of which exhibits a sinusoidal waveform; and solidifying the phase grating on the substrate.

2. The method according to claim 1 wherein the etching process is stopped when the thickness of the grating layer becomes substantially the same as the thickness of the offset layer, and the baking process is stopped when the minimum height of the sinusoidal waveform surface becomes a half of the maximum height of the sinusoidal waveform surface.

3. The method according to claim 1 wherein the sinusoidal surface extends two dimensionally.

4. The method according to claim 1 wherein the sinusoidal waveform is formed along one direction.

5. The method according to claim 1 wherein the thermoplastic resin is a photoresist.

6. The method according to claim 1 wherein the thermoplastic resin is an electronbeam resist.

7. The method according to claim 1 wherein the substrate is made of silicon.

8. The method according to claim 1 further comprising the step of making a stamper by depositing a nickel film on the optical low-pass filter by use of an electroforming technique.

9. The method according to claim 1 further comprising the steps of:

making a stamper using the optical low-pass filter as a master;

filling the stamper with a molten resin;

solidifying the resin in the stamper; and removing the stamper to obtain an optical low-pass filter made of the resin.

10. An optical low-pass filter manufactured by the method defined in claim 9, wherein the optical low-pass filter is of a sinusoidal waveform having a tolerance of less than about 7%.

11. An imaging device having the optical low-pass filter as defined in claim 10 disposed in front thereof.

12. A liquid-crystal panel having the optical low-pass filter as defined in claim 10.

13. A TV projector having the liquid-crystal panel as defined in claim 12.

14. A view finder for a video camera having the liquid-crystal panel as defined in claim 12.

15. An optical low-pass filter as recited in claim 10, wherein the tolerance is less than about 6%.

16. An optical low-pass filter as recited in claim 10, wherein the tolerance ms less than about 5%.

17. An optical low-pass filter as recited in claim 10, wherein the tolerance ms less than about 4%.

18. An optical low-pass filter as recited in claim 10, wherein the tolerance ms less than about 3%.

19. A display device having the optical low-pass filter defined in claim 10 disposed in front thereof.

20. The method according to claim 1 further comprising the steps of:

making a mold using the optical low-pass filter; and forming an optical low-pass filter with use of the mold by injection molding.

21. An optical low-pass filter manufactured by the method defined in claim 20, wherein the optical low-pass filter is of a sinusoidal waveform having a tolerance of less than about 7%.

22. A liquid-crystal panel having the optical low-pass filter as defined in claim 21.

23. A TV projector having the liquid-crystal panel as defined in claim 22.

24. A view finder for a video camera having the liquid-crystal panel as defined in claim 22.

25. An imaging device having the optical low-pass filter as defined in claim 21 disposed in front thereof.

26. A display device having the optical low-pass filter defined in claim 21 disposed in front thereof.

27. An optical low-pass filter as recited in claim 21, wherein the tolerance ms less than about 6%.

28. An optical low-pass filter as recited in claim 21, wherein the tolerance ms less than about 5%.

29. An optical low-pass filter as recited in claim 21, wherein the tolerance is less than about 4%.

30. An optical low-pass filter as recited in claim 21, wherein the tolerance is less than about 3%.

31. An optical low-pass filter manufactured by the method defined in claim 1, wherein the optical low-pass filter is of a sinusoidal waveform having a tolerance of less than about 7%.

32. A liquid-crystal panel having the optical low-pass filter as defined in claim 31.

33. A view finder for a video camera having the liquid-crystal panel as defined in claim 32.

34. A TV projector having the liquid-crystal panel as defined in claim 32.

35. An imaging device having the optical low-pass filter as defined in claim 31 disposed in front thereof.

36. A display device having the optical low-pass filter defined in claim 31 disposed in front thereof.

37. An optical low-pass filter as recited in claim 31, wherein the tolerance is less than about 6%.

38. An optical low-pass filter as recited in claim 31, wherein the tolerance is less than about 5%.

39. An optical low-pass filter as recited in claim 31, wherein the tolerance is less than about 4%.

40. An optical low-pass filter as recited in claim 31, wherein the tolerance is less than about 3%.

41. A method of manufacturing an optical low-pass filter comprising the steps of:

forming a mother layer made of a thermoplastic resin on a substrate;

forming a phase grating base layer comprising a grating layer and an offset layer disposed under the grating layer by etching the mother layer through a mask to make the grating layer and stopping the etching process so that the offset layer remains;

baking the phase grating base layer to melt and stopping the baking process when a phase grating defined by a surface having a sinusoidal shape is formed; and cooling the phase grating to solidify.

42. A method of manufacturing an optical low-pass filter comprising the steps of:

forming a phase grating base layer made of a thermoplastic resin and comprising a grating layer and an offset layer, the offset layer being disposed between the grating layer and a substrate; and baking the phase grating base layer to melt until a phase grating defined by a surface of sinusoidal waveform appears.

43. An optical low-pass filter comprising a substrate and a phase grating layer formed on said substrate, said phase grating layer including an offset layer portion disposed on said substrate, said phase grating layer having a smooth surface with a substantially sinusoidal-waveform shape having a tolerance of less than about 7%.

44. An optical low-pass filter comprising a substrate and a phase grating layer formed on said substrate, said phase grating layer having a surface formed by melting a resin and exhibiting a substantially sinusoidal-waveform shape having a tolerance of less than about 7%, said phase grating layer further including an unmolten offset layer portion disposed on said substrate.

45. An optical low-pass filter manufactured with use of a stamper, an inner surface of said stamper being defined by said surface of said phase grating layer of said optical low-pass filter as defined in claim 44.

46. An optical low-pass filter manufactured by injection molding with use of a mold, an inner surface of said mold being defined by said surface of said phase grating layer of said optical low-pass filter as defined in claim 44.

47. A liquid-crystal panel having an optical low-pass filter disposed on an outer side thereof, said optical low-pass filter comprising a substrate and a phase grating layer formed on said substrate, said phase grating layer including an offset layer portion disposed on said substrate, said phase grating layer further having a smooth surface with a substantially sinusoidal-waveform shape having a tolerance of less than about 7%.

48. A method of manufacturing an optical low-pass filter comprising the steps of:

engaging a stamper with a molten resin;

solidifying the resin; and removing the stamper to obtain an optical low-pass filter made of the resin, wherein the optical low-pass filter is of a sinusoidal waveform having a tolerance of less than about 7%.

49. The method according to claim 48, further comprising the step of:

making the stamper using an optical low-pass filter as a master.

50. A method of manufacturing an optical low-pass filter comprising the step of:

forming an optical low-pass filter with the use of a mold by an injection molding process, wherein the optical low-pass filter is of a sinusoidal waveform having a tolerance of less than about 7%.

51. The method according to claim 50, further comprising the step of:

making the mold using a master optical low-pass filter to shape the mold.

52. An optical low-pass filter, comprising:

a substrate layer;

an offset layer on top of the substrate layer; and a smooth, substantially sinusoidal-waveform shaped layer having a tolerance of less than about 7% on top of the offset layer.

53. A liquid crystal panel, comprising:

an optical low-pass filter, said filter including a substrate layer, an offset layer on top of the substrate layer, and a smooth, substantially sinusoidal-waveform shaped layer having a tolerance of less than about 7% on top of the offset layer.

* * * * *